United States Patent [19]

Carruthers et al.

[11] 4,038,039

[45] July 26, 1977

[54] PRODUCTION OF ALUMINA

[75] Inventors: Andrew Nicolson Carruthers, Dollard des Ormaux; John Edward Deutschman; Michael George Willis, both of Arvida, all of Canada

[73] Assignee: Alcan Research and Development Limited, Montreal, Canada

[21] Appl. No.: 703,005

[22] Filed: July 6, 1976

[30] Foreign Application Priority Data

July 7, 1975  United Kingdom ............... 28603/75

[51] Int. Cl.$^2$ ........................... C01F 7/06; B01D 9/02
[52] U.S. Cl. ................................. 23/293 R; 23/302 R; 210/24; 210/263; 423/119; 423/121; 423/122; 423/127; 423/130
[58] Field of Search ............... 423/119, 121, 122, 127, 423/130; 210/24, 263; 23/293 R, 302 R

[56] References Cited

U.S. PATENT DOCUMENTS

| | | | |
|---|---|---|---|
| 2,554,343 | 5/1951 | Poll | 210/503 |
| 2,806,766 | 9/1957 | Anderson | 423/129 |
| 2,935,376 | 5/1960 | Roberts | 423/119 |
| 2,981,600 | 4/1961 | Porter | 423/130 |
| 3,002,809 | 10/1961 | Walker | 423/121 |
| 3,372,985 | 3/1968 | Roberts et al. | 423/127 |
| 3,649,185 | 3/1972 | Furukawa et al. | 423/121 |
| 3,729,542 | 4/1973 | Goheen | 423/119 |
| 3,899,571 | 8/1975 | Yamada et al. | 423/130 |

FOREIGN PATENT DOCUMENTS

| | | | |
|---|---|---|---|
| 1,158,048 | 7/1969 | United Kingdom | 423/122 |
| 745,601 | 2/1956 | United Kingdom | 423/121 |

Primary Examiner—Herbert T. Carter
Attorney, Agent, or Firm—Cooper, Dunham, Clark, Griffin & Moran

[57] ABSTRACT

In order to control the sodium oxalate level in the liquor employed in the Bayer process for the production of alumina, a part of the spent liquor recovered from alumina trihydrate precipitation stage is concentrated by evaporation to render it supersaturated with respect to sodium oxalate. The thus concentrated liquor is then sprayed onto a packing in an enclosed space under conditions such that the supersaturation of the droplets at impact on the packing exceeds a critical supersaturation. The sprayed liquor deposits sodium oxalate on the packing and is recovered for recirculation to the process circuit.

11 Claims, 1 Drawing Figure

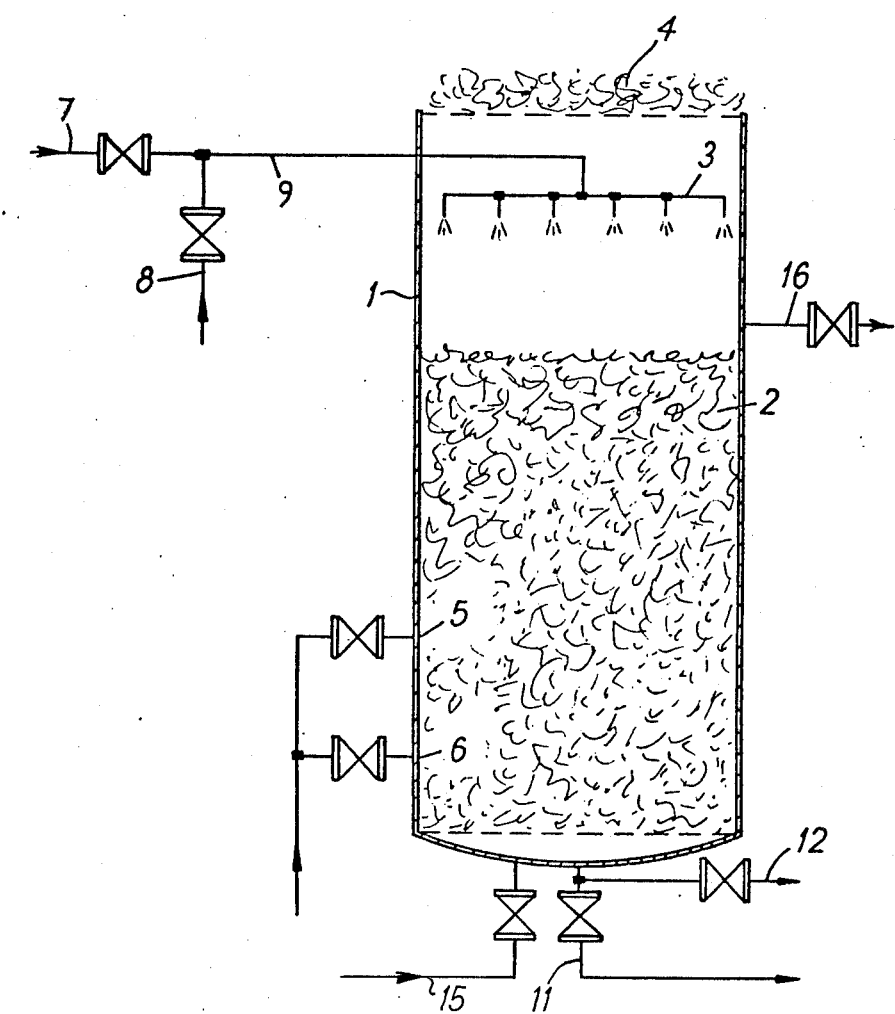

PRODUCTION OF ALUMINA

The present invention relates to improvements in the Bayer process for the production of alumina from bauxite ores.

In the Bayer process the bauxite ore is digested in a caustic soda liquor, which is then clarified to remove the insoluble "red mud" and then passed to a precipitator, in which it is seeded with fine alumina trihydrate and cooled to precipitate alumina trihydrate product from the supersaturated liquor. The spent liquor is recirculated to the digestion stage, after replenishing caustic soda losses and appropriate concentration of the spent liquor.

In the process the caustic liquor becomes progressively contaminated with organic substances, primarily sodium compounds of various carboxylic acids. The principal organic contaminant is sodium oxalate and it is conventional to refer to the organic contaminants collectively as "sodium oxalate". This contamination has various sources, being in part due to digestion of organic materials which are introduced into the digestion stage in the bauxitic ore. In part the organic contaminants in the spent liquor may be due to the use of flocculating agents, such as wheat flour, in the clarification of the digestion liquor before precipitation.

The presence of these organic contaminants in the Bayer process liquor leads to many disadvantages in the process. In particular it is found that sodium oxalate contaminants co-precipitate with aluminium hydroxide, causing production losses through poor settling in the thickeners, in which the fine "seed" alumina trihydrate is collected.

In commercial operation it is found necessary to control the sodium oxalate level. Such control may be exercised in various ways. One method of achieving control is to wash the seed alumina trihydrate before recharging it to the system in order to leach out the sodium oxalate which co-precipitates with the alumina trihydrate from the pregnant liquor. The washings are then usually treated with lime to precipitate calcium oxalate, which is filtered off, the filtrate being returned to the Bayer system to conserve caustic soda. Other routes followed include withdrawal, on a more or less continuous basis, of a minor stream of the process liquor, evaporating it to dryness and calcining the resulting solids to burn off the whole organic content. In another method withdrawn process liquor is partially evaporated until sodium carbonate and sodium oxalate co-precipitate from the concentrated liquor. The sodium salts are separated from the liquor and are either causticized with lime or calcined. Aluminous material, e.g. bauxite, may be added to the calcination process to produce additional sodium aluminate for the Bayer circuit. All of these routes are expensive to operate and complex, although some provide benefits additional to the removal of oxalate. U.S. Pat. Nos. 2,935,376; 2,981,600; 3,372,985 and 3,649,185 describe various methods for counteracting the presence of sodium oxalate.

The object of the present invention is to provide a method for controlling the level of sodium oxalate in Bayer process liquor which is simpler and more economical both in terms of operating costs and in terms of cost of equipment than the currently employed methods.

The method of the present invention springs from the observation that sodium oxalate precipitates more readily from Bayer process liquor, supersaturated with regard to sodium oxalate, on those parts of an evaporator which lie above the liquid level, in other words on those parts of the vessel onto which the liquor has splashed in the form of small droplets. We have accordingly concluded that sodium oxalate can be precipitated from Bayer process liquor, supersaturated with sodium oxalate, when liquid droplets are subjected to impact. This appears to be due to two known effects: destabilization of supersaturated solutions by mechanical shock; and rapid evaporation of minute droplets due to the high surface to weight ratio.

According to the present invention a part of the spent Bayer process liquor, recovered from the precipitation stage, is concentrated by evaporation and a stream of the concentrated Bayer process liquor is then sprayed onto a packing in an enclosed space, the liquor then being collected and recycled to the process circuit. In addition to concentration by evaporation, the supersaturation of the process liquor with regard to sodium oxalate is preferably further increased by cooling the concentrated liquor before spraying and/or in the course of the spraying operation. The spent liquor is supersaturated with sodium oxalate as it leaves the precipitation section, but is in a state of metastable equilibrium. The evaporation process in conjunction with the optional cooling serves to increase the concentration of oxalate and sodium ions well above the metastable equilibrium level.

The oxalate supersaturation, which provides the driving force for deposition of sodium oxalate from the process liquor, depends on a number of factors. Thus in addition to the temperature and oxalate concentration, the degree of supersaturation is also dependent on the concentration of sodium ion due to the presence of caustic soda (NaOH) and sodium carbonate. It follows that the reduction of the temperature of the concentrated Bayer process liquor from the evaporator will raise the degree of the supersaturation with regard to sodium oxalate. The temperature of the process liquor at the end of the evaporation stage is typically at a temperature in the range of 70°-80° C. However it is preferred to cool the liquor to 65° C or below before spraying. With relatively large quantities of liquor that require cooling, this involves a major heat exchange operation. For that reason and because the process liquor becomes increasingly viscous with cooling, it is preferred that the process liquor at the end of the cooling operation should have a temperature in the range of 45°-70° C consistent with a requirement of having the critical supersaturation of sodium oxalate.

Most conveniently the oxalate removal step is performed by spraying the concentrated process liquor downwardly under substantial pressure from the top of a vertical column onto a loose packing within the column. This causes the oxalate to precipitate on the packing in the form of a scale, which can be removed subsequently by solution in water, although it is preferred to leave some sodium oxalate on the packing to act as a seeding material. In consequence it is preferable to provide two or more columns arranged in parallel, so that at least one column may be in service in the precipitation operation while the packing of at least one other column is undergoing washing with a stream of water to reduce the precipitated sodium oxalate and thus provide a relatively unobstructed passage for liquor through the column.

The packing in the column should be relatively inert both to the Bayer process liquor and to the wash water in the subsequent regenerative stage. In fact a bed of scrap steel turnings has been found to provide a very satisfactory column packing for the purpose. It presents a suitable surface on to which the liquor spray droplets impact and allows the liquor to percolate freely through the packing after the initial impact. The liquor is then drained off from the bottom of the column and returned to the main liquor circuit direct or after further processing as explained below.

The impact of the spray droplets on the top of the packing appears to have the effect of destabilising the supersaturated sodium oxalate content of the liquor, which is thereafter deposited on the column packing as the liquor trickles through it. In one example the packing had a depth of about 4 meters and the residence time of the liquor in passage through the column was about ½ to 1 minute. In order to extend the time within which deposition may take place, the liquor withdrawn from the bottom of one column may be passed upwardly through the packing of a column, in which sodium oxalate had already been deposited on the packing. In such a system at least three columns would be provided. In the first stage of its service, the column would be employed for precipitation of sodium oxalate from sprayed concentrated Bayer process liquor entering the top of the column; in the second stage the column packing is employed as a submerged bed for further precipitation of sodium oxalate and in the third stage it is subjected to regenerative washing.

The size and velocity of the spray droplets at the moment of impact with the column packing does not appear to be especially critical. However, it is preferred that the droplet size should not exceed about 0.6 mm and it is preferred that the droplet velocity at the instant of impact should be at least about 10 meters per second. We find that adequate velocity and droplet size can be achieved by passage of the liquor through a fire-protection sprinkler nozzle which provides a hollow cone spray pattern under normal operating conditions — i.e. an input pressure of about 3.5 kg/cm$^2$. In general we find that the deposition rate increases with finer sprays. The number of spray nozzles may be decreased by employing nozzles which have a full cone spray pattern.

In many Bayer process alumina plants it is normal practice to concentrate a fraction of the spent liquor from the precipitation stage to a T.T.S. (total titrable soda) in excess of 285 g/litre (the total soda content being expressed in terms of $Na_2CO_3$). Such concentrated process liquor, typically at a temperature of 70°–80° C, may then be pumped directly to the oxalate-precipitation column for spraying onto the column packing.

In other plants where evaporation of liquor is practised on a smaller scale, it would be advantageous to concentrate a fraction of the circulating process liquor to a T.T.S. of 290–450 g/liter, depending upon economic optima, to take advantage of this simple procedure for control of oxalate level in the process liquor.

In one example of the invention spent process liquor, concentrated to 300 g/liter T.T.S., was pumped through an array of fire-protection sprinkler nozzles (i.e. pressure atomized spray nozzles with hollow conical spray cones) into a column of 1.70 meters diameter and containing a packing layer of mild steel turnings to a depth of 4 meters. The liquor was supplied at a temperature of 160° F (71° C) at a rate of 225 liters/min. and was withdrawn from the bottom of the column at a temperature of 148° F (64.5° C).

It was found possible by the use of this simple arrangement to remove sodium oxalate in amounts up to 200 kg. per day. This sodium oxalate is deposited in the form of a strong scale on the packing surfaces and is in consequence retained in the column. The effective extraction of sodium oxalate by means of this column was in this example increased by passing a counter current of air upwardly through the packing to cause localized cooling and further localized concentration by evaporation of the process liquor.

The regeneration of the column is readily achieved and for that purpose it is preferred to use hot (95° C) condensate from the evaporation stage to dissolve the sodium oxalate and remove it from the packing. Where there is no use for the thus produced sodium oxalate, the solution may be treated with lime to precipitate calcium oxalate, which may then be sold, disposed of, or calcined to regenerate lime. The filtrate after calcium oxalate removal, is usually returned to the Bayer process to conserve its caustic soda value.

The system described herein may be modified in various ways without departing from the invention. Thus, caustic soda solution may be added to the feed. Such an addition increases the sodium ion content and thus increases the supersaturation of the process liquor with regard to sodium oxalate, with the result that sodium oxalate may precipitate at a lower oxalate ion concentration and have an effect similar to extra evaporation or cooling of the process liquor. Caustic soda must be added to the liquor stream in most Bayer process plants, so that no extra expenditure is involved. In another modification, instead of introducing air into the lower part of the column, the upper part of the column above the packing and below the sprinkler nozzles may be continuously supplied with cool air to cause cooling and evaporation of water from the sprayed droplets. The air may be supplied by natural draught effects via inlets in the column wall, the draught being provided by a chimney at the top of the column. In such a construction it is preferred to incorporate a mist eliminator positioned above the spray nozzles to take off mistsize droplets from the exhaust air. Air may also be admitted through the spray nozzles, together with the concentrated liquor, thereby simultaneously atomizing, evaporating and cooling the liquor stream.

One form of column for putting the invention into effect is shown semi-diagrammatically in the accompanying FIG. 1.

A cyclindrical columnar vessel 1 is partially filled with a packing body 2, formed of mild steel turnings. An array of spray nozzles are provided in radial spray bars 3, arranged at 45° to each other and at a height of about 1 meter above the packing 2 so as to ensure even distribution of the spray over the top of the packing. A further mass of fine wire mesh is provided at 4 above the spray bars 3 to eliminate mist droplets carried in the upwardly directed stream of air, which arises from the admission of air through ports 5 and 6 in the lower part of the vessel. Valve-controlled conduits 7 and 8 are provided for the supply respectively of concentrated process liquor and was water (condensate) to the main manifold 9 leading to the spray bars 3. The deoxalated process liquor and the oxalate wash solution are led off through the valve-controlled outlets 11 and 12 respectively.

In addition the column may be provided with an inlet 15 and outlet 16 to permit the process liquor, which has already been subjected to the spraying operation of the invention in an earlier stage, to be passed upwardly through the packing, as discussed earlier.

The cooling of the process liquor in the column may be achieved by placing cooling coils within the column or in heat exchange relation with the stream of process liquor supplied via conduit 7, for example by the use of a water jacket. These forms of cooling may be used in addition to evaporative cooling in the spray column.

We claim:

1. A procedure for controlling the sodium oxalate level in the liquor employed in the Bayer process for the production of alumina from bauxite ore which comprises concentrating by evaporation a part of the spent liquor recovered from the precipitation stage to render to supersaturated with respect to sodium oxalate, spraying such concentrated liquor onto a packing in an enclosed space to impinge on such packing in the form of rapidly moving droplets, the evaporation of the liquor being continued in the evaporation stage until the sodium oxalate exceeds a critical supersaturation with reference to temperature of droplets at impact on the packing, recovering the sprayed liquor from the enclosed space and recycling said liquor to the process circuit.

2. A procedure according to claim 1 further comprising spraying the concentrated spent liquor onto the top of an open bed of packing material, allowing the liquor to percolate through said open bed and recovering the liquor from the bottom of said bed after percolation therethrough.

3. A procedure according to claim 2 in which the packing comprises a mass of steel turnings.

4. A procedure according to claim 2 in which the depth of the bed is sufficient to achieve a residence time of at least ½ minute of the liquor during percolation therethrough.

5. A procedure according to claim 2 further comprising passing a steam of air upwardly through the bed of packing material in countercurrent relation to the sprayed spent liquor.

6. A procedure according to claim 2 further comprising passing the liquor, recovered afer percolation through the bed of packing material, upwardly through a submerged bed of packing material.

7. A procedure according to claim 1 in which the liquor is reduced to a droplet size of below 0.6 mm during spraying.

8. A procedure according to claim 1 further comprising spraying the concentrated liquor under conditions to achieve a droplet velocity in excess of 10 meters/sec. at the instant of impact on said packing.

9. A procedure according to claim 1 further comprising concentrating the spent liquor before spraying to a total titrable soda content in excess of 285 g/liter, expressed as $Na_2CO_3$.

10. A procedure according to claim 1 further comprising introducing cool air into said enclosed space to cool the droplets of sprayed liquor before impact on the packing.

11. A procedure according to claim 1 further comprising adding caustic soda to the spent liquor after recovery from the precipitation stage and before spraying.

* * * * *

UNITED STATES PATENT AND TRADEMARK OFFICE
CERTIFICATE OF CORRECTION

PATENT NO. : 4,038,039
DATED : July 26, 1977
INVENTOR(S) : Andrew Nicolson Carruthers et al.

It is certified that error appears in the above-identified patent and that said Letters Patent are hereby corrected as shown below:

Column 4, line 52, "cyclindrical" should read --cylindrical-- ;

line 64, "was" should read --wash-- .

Column 5, line 18, before "supersaturated", "to" should read --it-- .

Column 6, line 12, "afer" should read --after-- .

Signed and Sealed this

Eleventh Day of April 1978

[SEAL]

Attest:

RUTH C. MASON
Attesting Officer

LUTRELLE F. PARKER
Acting Commissioner of Patents and Trademarks